United States Patent [19]

Cole et al.

[11] 4,386,685

[45] Jun. 7, 1983

[54] BRAKE TAKE-UP MECHANISM WITH A SPRING BIASED ROTARY ADJUSTMENT

[75] Inventors: John F. Cole; Frederick S. Dowell, both of Coventry, England

[73] Assignee: Dunlop Limited, London, England

[21] Appl. No.: 213,015

[22] Filed: Dec. 4, 1980

[30] Foreign Application Priority Data

Aug. 28, 1980 [GB] United Kingdom ............... 8027865

[51] Int. Cl.³ ............................................. F16D 65/56
[52] U.S. Cl. ............................. 188/196 P; 188/71.9; 188/196 D; 188/196 V
[58] Field of Search .............. 188/71.9, 196 D, 196 P, 188/196 V, 71.8; 192/111 A

[56] References Cited

U.S. PATENT DOCUMENTS

| 2,949,173 | 8/1960 | Peras | 188/71.9 |
| 3,605,959 | 9/1971 | Beck | 188/196 P |
| 3,762,513 | 10/1973 | Farr | 188/196 D |
| 3,920,103 | 11/1975 | Haraikawa | 188/71.9 |
| 4,014,414 | 3/1977 | Yamamoto | 180/170 |

FOREIGN PATENT DOCUMENTS

| 1750914 | 4/1971 | Fed. Rep. of Germany . |
| 2131053 | 1/1973 | Fed. Rep. of Germany . |
| 873522 | 7/1961 | United Kingdom . |
| 936144 | 9/1963 | United Kingdom . |
| 1190841 | 5/1970 | United Kingdom . |
| 1248745 | 10/1971 | United Kingdom . |
| 1292220 | 10/1972 | United Kingdom . |
| 1416115 | 12/1975 | United Kingdom . |
| 1420724 | 1/1976 | United Kingdom . |
| 1447359 | 8/1976 | United Kingdom . |
| 1510109 | 5/1978 | United Kingdom . |
| 1553874 | 10/1979 | United Kingdom . |
| 2031540 | 4/1980 | United Kingdom . |

Primary Examiner—Douglas C. Butler
Assistant Examiner—R. R. Diefendorf
Attorney, Agent, or Firm—Stevens, Davis, Miller & Mosher

[57] ABSTRACT

The invention consists of a slack-adjuster for a brake which comprises a pair of interengaged screw threaded members which are urged towards an extended relative position by an axial bias applied to one member. The screw thread has a high helix angle to permit adjustment to take place on release of the brake and reverse rotation is prevented by frictional engagement of the leading member with a brake applying plunger part and by the use of a saw-tooth screw thread.

5 Claims, 2 Drawing Figures

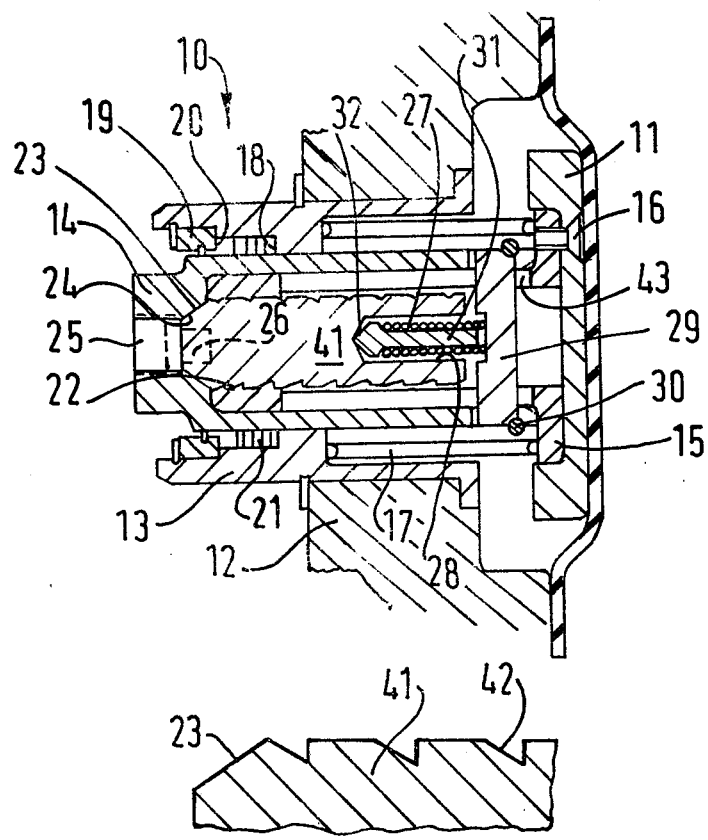

BRAKE TAKE-UP MECHANISM WITH A SPRING BIASED ROTARY ADJUSTMENT

This invention relates to an improved brake slack-adjuster, by which is meant a mechanism for controlling the position to which a brake applying element is returned when braking pressure is relieved, this position progressively advancing toward the brake friction surfaces as the latter become thinner through wear so that the travel of the element remains substantially constant throughout the working life of the friction surfaces.

For many years the problem has been recognized that while the member which applies brake pressure has a fixed travel relative to the vehicle, brake shoes, linings or discs become thinner as they wear and with certain brakes such as spring- or air-pressure operated brakes there is consequently a danger that they will be subject to progressively lower pressure when the brakes are applied.

To overcome this problem slack-adjusters have been proposed which effectively lengthen a thrust applying element of the brake as the friction surfaces wear. In one form of such a slack-adjuster which is illustrated in our co-pending British patent application publication No. 2031540A the thrust applying element comprises two parts which are capable of telescopic extension. One part is fixed to and movable with the brake pressure application member and the other part is frictionally engaged by a stop which has limited movement between fixed abutments. If when the brake is applied the stop contacts the abutment nearer the brake friction members the brake applying thrust overcomes the frictional resistance of the stop displacing it along the part of the transmission element which it engages so that when subsequently brake pressure is relieved and a spring returns the transmission element the stop contacts the other abutment in a new position on the element (the return spring not overcoming the friction of the stop) so that the effective length of the transmission element is extended.

In this prior art slack-adjuster brake application pressure is transmitted between the two parts of the transmission element by an array of spring fingers on one part which have pawl-like teeth engaging ratchet-like teeth on the other part. The ratchet teeth are in the form of co-axial annular grooves and to permit extension of the transmission element the pawls ride from one tooth to the next.

Drawbacks of this construction are that the annular grooves are relatively difficult and expensive to produce and in order to disengage the pawls from the grooves to enable the slack-adjuster to be re-set to its minimum length after replacing the friction members of the brake a special tool must be introduced to separate the fingers. Moreover the extension of the transmission element, in use, is in increments represented by the interval between adjacent annular grooves since the two parts of the transmission element are only locked for joint movement when the pawls engage one of the grooves and not if the pawls are on a crest between two grooves. The effective length of the transmission element is thus not infinitely variable but variable in increments equal to the intervals between the teeth whereas it will be appreciated that the wear of the friction surfaces is progressive and not similarly incremental.

Among the objects of the present invention are to provide a slack-adjuster mechanism which while easier and cheaper to produce and assemble will provide infinite variation of its effective length, within the necessary limits, and will also facilitate maintenance in that it can be reset by a simple, readily available tool such as a screwdriver or Allen key.

In accordance with the present invention there is provided a slack-adjuster mechanism for controlling the elongation of a two-part brake pressure transmission element to compensate for wear, in use, of the friction surfaces of a brake, the element being biassed to a retracted position and the relative position of the two parts of the element when retracted being determined by the position on the element of stop means frictionally engaging the same and movable therewith between fixed abutments, the mechanism comprising inter-engaged screw threaded members movable with one part of the element, one of said members being biased to move relative to said one part, rotating relative to the other member, to tend to maintain a load-bearing face of said one member in contact with a load-bearing face of the other part whereby in all relative positions of said parts controlled by said stop means brake application pressure can be transmitted between the parts of the element via the screw threaded members and said load-bearing faces.

In a preferred embodiment of the invention the said biased screw-threaded member comprises a shank formed along its length with a screw thread of high helix angle, its leading end being in the form of the frustum of a cone engageable with a frusto-conical shoulder in a bore in the other part of the element in which said shank is located, the leading end of said other part being apertured for the insertion therethrough of a tool to engage a recess in the leading end of the shank so that the latter can be rotated to reset the mechanism. The other end of the shank is preferably formed with a blind bore in which a compression spring is located acting between the shank and a cross-member fixed relative to the other part. The other screw threaded member engages the shank in the form of a nut. The effect of this arrangement is that whatever the relative position of the two screw threaded members the compression spring will urge the shank toward and into contact with the frusto-conical shoulder, the shank being free to rotate to enable it to move through the nut and thus move longitudinally to maintain the contact between the load-bearing faces. To re-set the mechanism the shank is simply counter-rotated by a tool inserted through the aperture in said other part until the nut has been brought back to its starting position nearest the frusto-conical shoulder.

A preferred embodiment of the invention will now be described with reference to the accompanying drawings in which:

FIG. 1 illustrates in sectional elevation a brake pressure transmission element equipped with a slack-adjuster mechanism in accordance with the present invention, and FIG. 2 is a partial view on an enlarged scale of the bolt-like element 41.

The drawings illustrate a brake pressure application element 10 designed to transmit brake pressure applied to a plate 11 on one side of a mounting 12, which is a fixed part of a vehicle, to the friction members of a brake (not shown) located to the left of the element 10, as viewed. The element comprises an outer part or sleeve 13 fixed relative to the mounting 12 and within the sleeve 13 a two-part plunger comprising a hollow, outer part 14 and an inner part 15 which has a flanged rear end fixed, as by screws 16, to the plate 11. The inner part 15 of the plunger is biased by a compression spring 17 to the retracted position in which it is shown, the spring 17 being located in an annular recess in the sleeve 13.

The leading end of the sleeve 13 is also formed with an annular recess the inner end of which defines a first abutment 18 and spaced from the abutment 18 a ring 19 is fixed in this recess to provide a second abutment 20. Between the abutments 18 and 20 a ring 21 frictionally grips the outer part 14 of the plunger. The ring 21 thus provides a stop which, after it has contacted the abutment 18, prevents a further retraction of the outer part 14 of the plunger by the spring 17, but if the plunger 15, 14 is thrust to the left, as viewed, beyond the position where the stop 21 encounters the abutment 20 the frictional resistance of the ring 21 will be overcome and it will be displaced longitudinally of the outer part 14 of the plunger. When thereafter brake pressure is relieved and the spring 17 returns the plunger its outer part 14 will adopt a new retracted position when the ring 21 encounters the abutment 18. Since the travel of the plate 11 under brake pressure will be determined by the thickness of the brake friction surfaces, as these surfaces wear thinner the outer part 14 of the plunger will move telescopically relative to the inner part 15 so that in its retracted position, the leading end of the plunger will remain at a substantially constant distance from the friction members of the brake throughout the working life of the latter.

In accordance with the present invention, brake application pressure is transmitted between the parts 15 and 14 of the plunger by a bolt-like element 41 which has a shank screw-threaded with a thread 42 of high helix angle engaging screw threads 22 formed internally in the leading end of the inner plunger part 15 and by abutment between the frusto-conical leading end 23 of the shank 41 and a frusto-conical shoulder 24 in the bore of the outer plunger part 14. The shape of the thread 42 is more clearly shown in FIG. 2 and it will be appreciated that the thread 22 is of corresponding, saw-tooth shape. The leading end of the outer plunger part 14 has an aperture 25 through which access can be gained to a recess 26 in the leading end of the shank 41 to permit resetting of the plunger when the friction members of the brake are replaced.

The shank 41 is free to rotate within the inner plunger part 15 and is spring biased to tend to maintain its load-bearing surface 23 in contact with the load-bearing surface 24 of the outer plunger part 14 by a compression spring 27 located in a blind bore 28 in the rear end of the shank 41 and acting between the latter and a cross-member 29 which is fixed by a circlip 30 relative to the outer plunger part 14. A guidance and support pin 31 supports the spring 27 internally and its conical end 32 makes a point contact with the closed end of the blind bore 28 to facilitate rotation of the shank 41.

In use, after the friction ring 21 has been displaced relative to the outer part 14 of the plunger by contact with the abutment 20 and the plunger is subsequently returned by the spring 17 until the stop ring 21 contacts the abutment 18, the inner part 15 of the plunger will tend to move back further than the outer part 14 of the plunger and the consequent telescopic extension of the two parts 14 and 15 of the plunger will be permitted by displacement of the shank 41 against the action of the spring 27 and rotation of the shank 41 in the screw threads 22. However the pressure of the spring 27 will ensure that such rotation of the shank 41 will continue until the load bearing surfaces 23 and 24 are once more in contact. Thus as the effective length of the plunger 14,15 is extended, the leading end of the inner part 15 of the plunger having the screw threads 22 will move progressively further away from the load bearing surface 24 of the outer part 14 of the plunger (a slot 43 permitting movement of the cross-member 29 relative to the inner plunger part 15) but the load bearing surface 23 of the shank 41 will remain on contact with the load bearing surface 24 so that brake application pressure will continue to be transmitted from the inner plunger part 15 to the outer plunger part 14 through the inter-engaged screw threads of the inner plunger part 15 and the shank 41 and through the abutted load bearing surfaces 23 and 24.

It will be appreciated that when the leading end of the inner plunger part 15 having the screw threads 22 has moved relatively away from the abutment surface 24 of the outer plunger part 14 telescopically to extend the plunger, and when the assembly is placed under a compressive force by the application of braking pressure to the plate 11, which causes the friction members of the brake (not shown) to apply an equal and opposite reaction force to the leading end of the plunger having the aperture 25, there will be a tendency for the shank 41 to screw back through the thread 22 to the initial, unextended condition of the plunger in which it is shown in FIG. 1. The fact that the threads 42 and 22 are of high helix angle, while facilitating rotation of the shank by the spring 27, increases this danger.

Two measures are adopted to prevent such undesired counter-rotation of the shank 41. Firstly the friction surfaces 23 and 24 are not only larger than those present at the point contact 32, they are also non-perpendicular to the axis of the shank 41 so that the leading end 23 of the shank tends to jam against the surface 24 until positively drawn away from it. Secondly, as is more clearly seen in FIG. 2, the screw threads 42 and 22 are cut with a saw-tooth cross-section having a leading face inclined with respect to the axis of the shank 41 and a rear face perpendicular thereto. The co-operating inclined faces of the screw threads present maximum resistance to rotation of the shank 41 by the plunger part 14, but when the assembly is subject to forces which bring the perpendicular faces of the screw threads 42 and 22 into abutment (i.e. when the shank 41 is to be rotated by the spring 27) they will present a smaller frictional resistance to rotation of the shank 41.

When it is necessary to replace the worn friction surfaces of the brake and it is desired to reset the slack-adjuster mechanism to the initial position in which it is shown, all that it is necessary is to insert a suitable tool such as a screw driver or Allen key through the aperture 25 in the outer part 14 of the plunger to engage the recess 26 in the shank 41 and by means of this tool rotate the shank 41 until the threaded end 22 of the inner part 15 of the plunger is brought back to the position in which it is shown adjacent the load-bearing surface 24 of the outer plunger part 14.

Not only is the screw thread 42 of the shank 41 easier to make than the discrete, co-axial grooves hitherto used in a slack-adjuster but by virtue of the screw threaded engagement of the shank 41 with the threads 22 of the inner plunger part 15 the two parts 14 and 15 of the plunger are capable of infinite mutual telescopic adjustment within the limits determined by the desired, maximum extension of the plunger 14,15. The resetting of the mechanism is easily effected by a commonly available tool and the mechanism as a whole is both easier and less costly to manufacture and easier to maintain.

Having now described our invention what we claim is:

1. A take-up mechanism for a brake pressure application device which has a fixed housing and a two-part plunger movable relative to the housing to transmit brake pressure between opposite ends of said plunger, the two parts of the plunger being relatively telescopic to change the effective length of the plunger between said ends thereof, means biasing the plunger to a retracted position, fixed stop means fixed relative to the housing and movable stop means frictionally engaging one of said plunger parts, said movable stop means co-operating with said fixed stop means to determine the telescopic extension of said plunger parts when retracted by said biasing means, the take-up mechanism being positioned to transmit thrust between said plunger parts when moved in opposition to said biasing means, said take-up mechanism comprising a member which is in screw threaded engagement with one of said plunger parts, biasing means acting between said member and the other plunger part and between abutment surfaces of said member and said other plunger part, the biasing means acting between said screw threaded member and the other plunger part tending to rotate said screw threaded member to maintain said abutment surfaces in contact and the arrangement being such that any tendency of the means biasing the plunger to the retracted position to separate said abutment surfaces will be compensated by rotation of said member under the bias thereof to bring said abutment surfaces into contact.

2. A take-up mechanism as claimed in claim 1 wherein the biased screw threaded member comprises a shank formed along its length with a screw thread of high helix angle in engagement with a screw thread of said one plunger part, the leading end of said shank being in the form of the frustum of a cone engageable with a frusto-conical shoulder in said one plunger part.

3. A take-up mechanism as claimed in claim 2 wherein the other end of the shank is formed with a blind bore, a compression spring being located in said bore and abutting a cross-member fixed relative to the said other plunger part to urge the shank towards and into contact with the frusto-conical shoulder.

4. A take-up mechanism as claimed in claim 3 wherein the compression spring engages a pin having an end making point contact with the closed end of the blind bore.

5. A take-up mechanism as claimed in claim 2 wherein the leading end of said other plunger part has an aperture through which access can be gained to the leading end of said shank to permit re-setting of the biased screw threaded member.

* * * * *